United States Patent [19]
Robbins, III

[11] Patent Number: 5,244,125
[45] Date of Patent: Sep. 14, 1993

[54] RE-COLLAPSIBLE CONTAINER WITH SPRAY HEAD

[76] Inventor: Edward S. Robbins, III, 2802 E. Avalon Av., Muscle Shoals, Ala. 35661

[21] Appl. No.: 833,854

[22] Filed: Feb. 12, 1992

Related U.S. Application Data

[63] Continuation-in-part of Ser. No. 789,838, Nov. 12, 1991.

[51] Int. Cl.$^5$ .............................................. B67D 5/40
[52] U.S. Cl. .................................... 222/382; 222/385; 222/529
[58] Field of Search ............... 222/383, 385, 529, 143, 222/106, 207, 527, 528, 382

[56] References Cited

U.S. PATENT DOCUMENTS

| | | | |
|---|---|---|---|
| 4,722,458 | 2/1988 | Van Dal | 222/529 X |
| 5,004,123 | 4/1991 | Stoody | 222/383 X |
| 5,156,299 | 10/1992 | DeCaluwe et al. | 222/383 X |

Primary Examiner—Gregory L. Huson
Attorney, Agent, or Firm—Nixon & Vanderhye

[57] ABSTRACT

This invention relates to reusable and re-collapsible containers, and particularly to a one-piece container having a peripheral side wall which is arranged to include areas of differential wall thickness and diameter to thereby permit collapse of the container from an extended to a collapsed condition by reason of a telescoping relationship between the various portions of the peripheral side wall. The container is provided with a closure incorporating a low profile spray head which is substantially nested within the container when the container is collapsed.

21 Claims, 6 Drawing Sheets

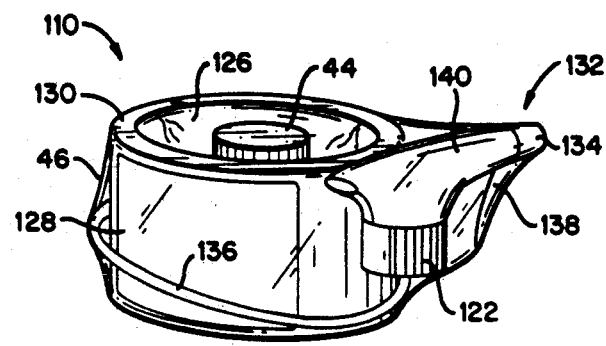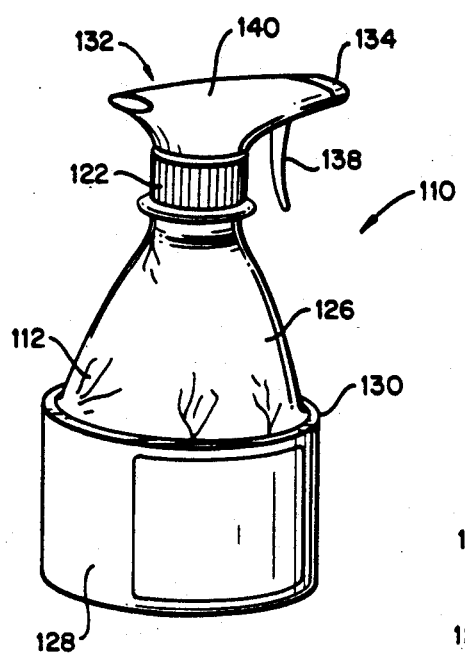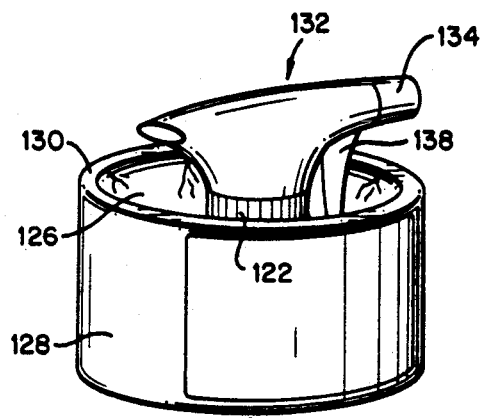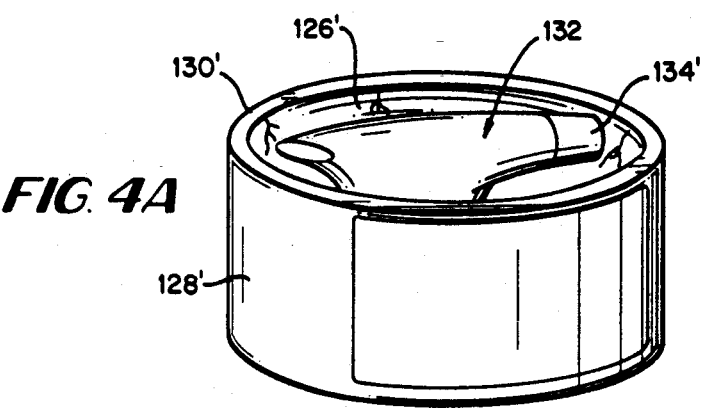

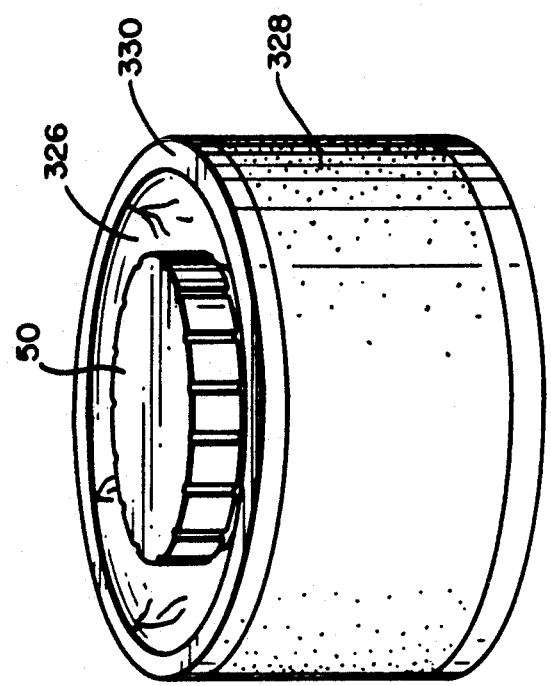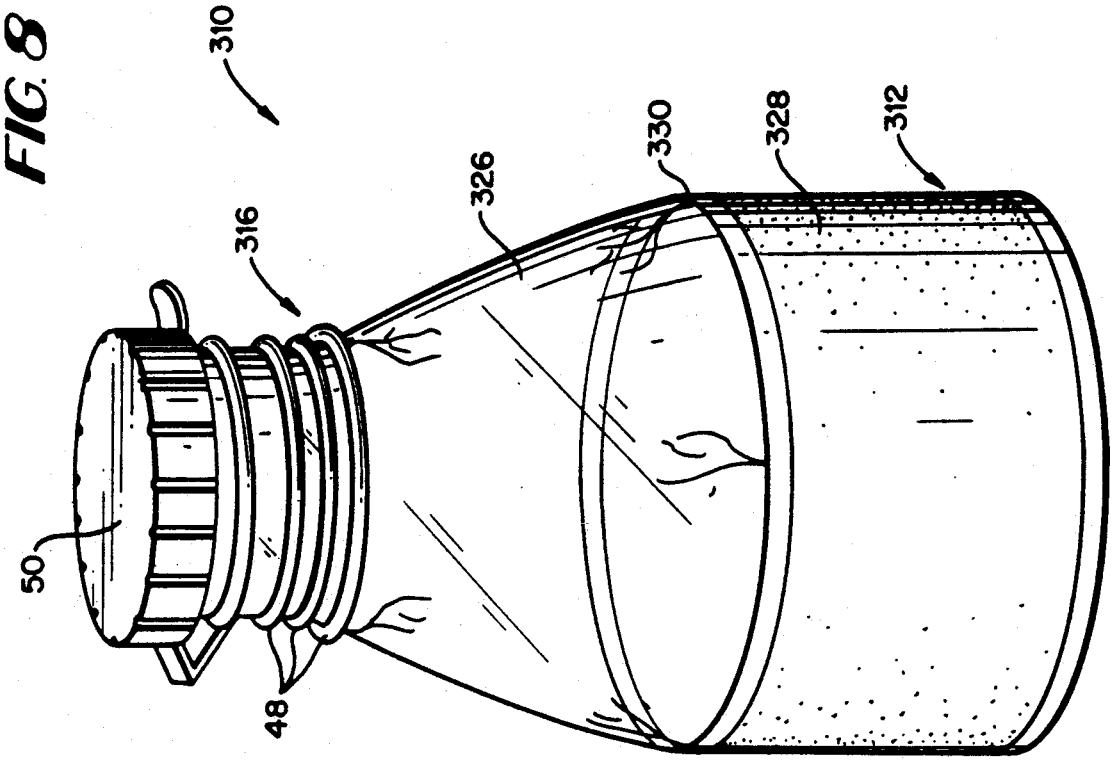

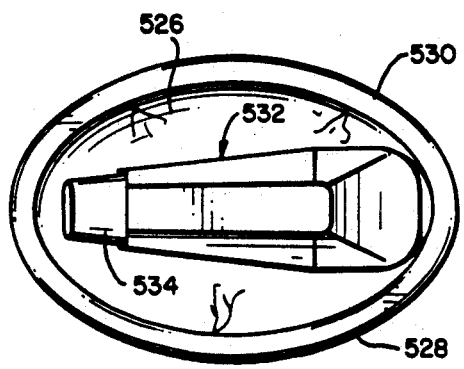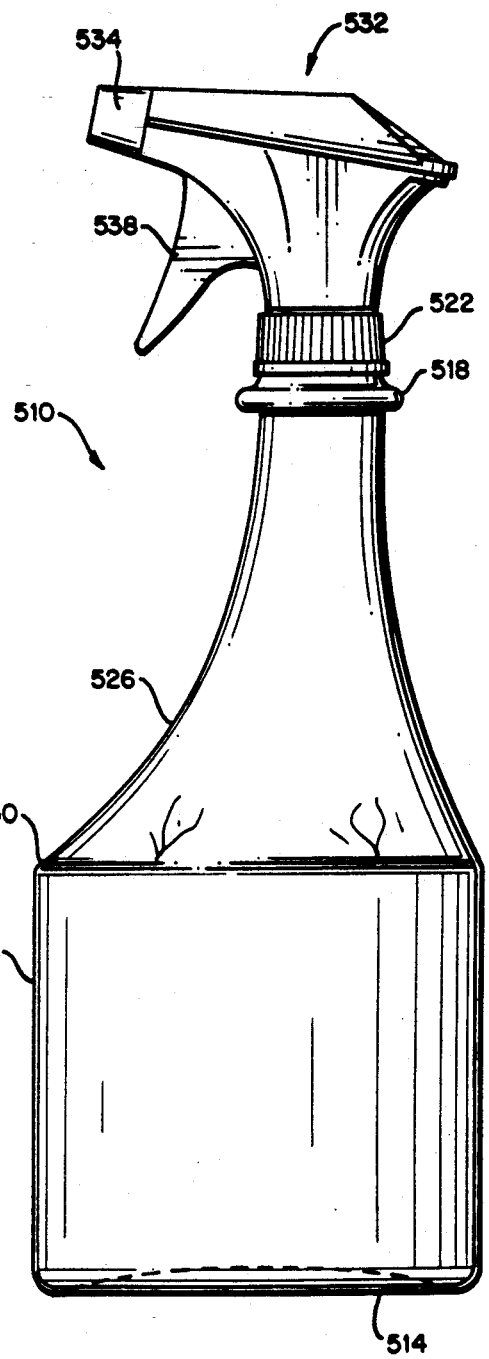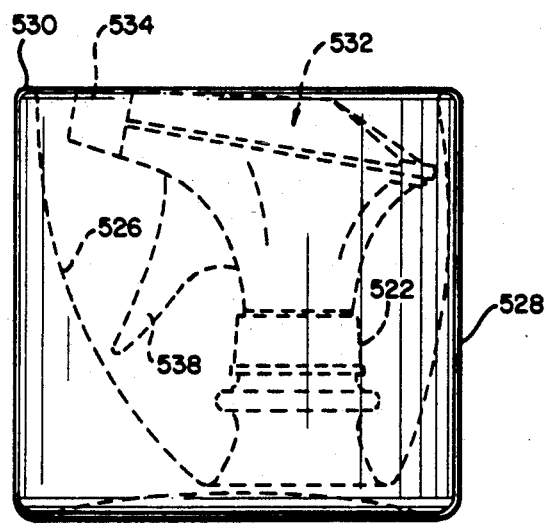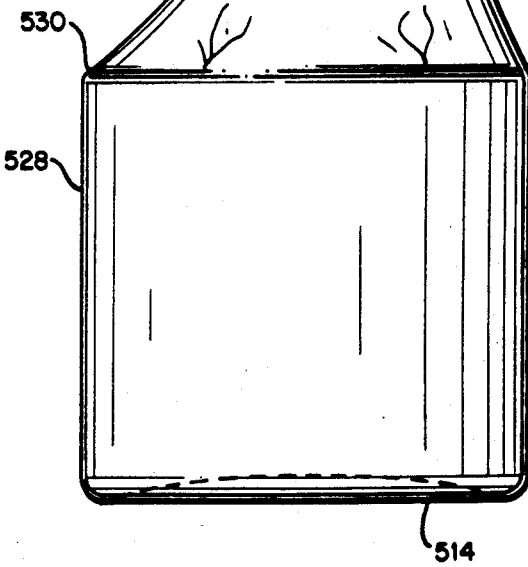

RE-COLLAPSIBLE CONTAINER WITH SPRAY HEAD

RELATED APPLICATIONS

This application is a continuation-in-part of applicant's co-pending application Ser. No. 07/789,838 filed Nov. 12, 1991, the entirety of which is incorporated herein by reference.

BACKGROUND AND SUMMARY OF THE INVENTION

This application is also generally related to applicant's co-pending applications Ser. Nos. 07/576,080 filed Aug. 31, 1990, now; 07/598,385 filed Oct. 18, 1990, now U.S. Pat. No. 5,114,011; 07/603,182 filed Oct. 24, 1990, now U.S. Pat. No. 5,060,847; 07/706,853 filed May 29, 1991; and 07/719,711 filed Jun. 26, 1991.

This invention relates to reusable and re-collapsible containers, and particularly to a one-piece container having a peripheral side wall which is arranged to include areas of differential wall thickness and diameter to thereby permit collapse of the container from an extended to a collapsed condition by reason of a telescoping relationship between the various portions of the peripheral side wall. The preferred embodiment of the invention according to this continuation-in-part application is directed toward a more specialized container which not only incorporates the above features, but an additional one as well, i.e., a low profile spray head type closure removably attached to the container such that, in the collapsed condition, the spray head lies substantially within the container profile. Stated otherwise the spray head is fully nested in the collapsed condition so as not to protrude to any significant extent above the upper fold edge of the container side wall. Other related embodiments, with and without spray heads, are also disclosed.

Collapsible containers, drinking cups and the like are, of course, well known. For example, in applicant's own prior U.S. Pat. No. 4,930,644, a collapsible, thin film plastic container is disclosed wherein a major portion of the container side wall has a reduced wall thickness to permit random collapse of the side wall. In U.S. Pat. No. 4,865,211, a plastic bottle having a uniform wall thickness throughout the side wall, is configured to permit collapsing of the container through telescoping movement of one portion of the side wall into another portion of the side wall.

In U.S. Pat. No. 4,875,576, a container is disclosed wherein an intermediate portion of the side wall incorporates a bellows-type arrangement for facilitating collapse and extension of the container. The patent also discloses the use of helical creases which spiral or angle between first and second portions of the container side wall to facilitate collapsing action of the creased portion of the side wall.

In U.S. Pat. No. 4,873,100, a bi-stable, expandable plastic bottle is disclosed which incorporates a bellows-type side wall for movement between collapsed and extended positions.

In U.S. Pat. No. 2,880,902, a collapsible, drinking cup (or camera bellows) is disclosed wherein the side wall is composed of alternating thick and thin portions.

The present invention incorporates a number of features not previously found in the prior art and which result in simple, easy-to-use, low cost containers which may be used and reused by the consumer as desired, and which may be stored in a collapsed condition, maximizing storage space, etc. At the same time, by significantly reducing the thickness of the container side wall in an intermediate portion thereof, source reductions in the amount of plastic required to manufacture the containers are realized.

More specifically, in the various exemplary embodiments disclosed in this continuation-in-part application, one-piece containers (formed by extrusion/blow molding or other appropriate forming methods) are each formed with a peripheral side wall divided into upper, intermediate and lower portions with the upper and lower portions having significantly greater wall thickness than the intermediate portion. For example, the intermediate portion may have a wall thickness of preferably between about 5 and about 20 mils which permits the intermediate portion to reverse fold as the upper and lower portions are moved toward one another in the aforementioned telescoping relationship.

It is also a feature of the invention that the peripheral side wall of each container include at least one well defined fold line or crease (or other surface configuration) which facilitates the axial collapse of the container. In one embodiment, a circumferential step is provided where the intermediate portion joins to the lower portion by reason of the differential wall thickness. Other arrangements such as those disclosed in the above identified parent application may be employed as well. In each case, the fold line, crease or other surface configuration enables collapse of the container in such a way that the upper portion collapses downwardly into the lower portion, with the intermediate portion at least partially reverse folded.

As mentioned above, a significant feature of the preferred embodiments of the invention relate to low-profile spray heads which are incorporated in screw cap type or other conventional (such as snap-on type) closures. The low-profile spray heads, including hand grip portions and nozzle portions, have relatively small vertical dimensions or depths, i.e., the circumferential extent or width of the spray heads in a horizontal direction is considerably greater than the thickness or height of the spray heads in a vertical direction (as viewed in an upright, in-use orientation). These configurations permit the spray heads to be substantially fully enclosed or nested within the collapsed container profiles.

In another embodiment, a more conventional "upright" spray head is used. While the spray head does protrude above the container in the collapsed condition, space savings are nevertheless realized by reason of the collapsibility feature per se. Moreover, a novel packaging technique, where the spray head and associated draw tube are wrapped externally about the container, permits the container to be shipped with maximum space saving.

In a related embodiment, the container itself is formed in a generally oval shape which permits the conventional, upright spray head to be fully nested within the container in the collapsed condition.

In still another embodiment, a collapsible container with a relatively flat screw type closure is provided wherein the container neck and closure are fully nested or enclosed within the collapsed container profile. In a related embodiment, the intermediate tapered portion of the container has a generally concave surface configuration which facilitates the collapsing action with wall thicknesses in this intermediate portion at the upper end of the disclosed 5-20 mil range.

Thus, in one aspect, the invention relates to a collapsible, extendable and recollapsible, plastic container comprising a peripheral side wall extending between a bottom wall at one end thereof and a discharge opening at an opposite end thereof, the side wall having an upper portion, an intermediate portion and a lower portion, wherein at least the intermediate portion has a wall thickness less than the wall thickness of the lower portion, and wherein cross-sectional area of at least the intermediate side wall portion progressively varies so that the upper and intermediate portions may be collapsed into the lower portion, and wherein the discharge opening is closed by a removable cap incorporating a spray head, the spray head lying substantially within the lower side wall portion when the container is collapsed.

In another aspect, the invention relates to a reusable plastic container comprising a bottom wall, a side wall including an upper dispensing portion including discharge opening, the side wall further including an intermediate portion and a lower portion and wherein the intermediate portion has a wall thickness less than the dispensing and lower portions, and further wherein the intermediate side wall portion is tapered so that the side wall is axially and manually collapsible to a condition where the dispensing and lower portions are telescoped one within the other with the intermediate portion at least partially reverse folded therebetween so that the dispensing portion is fully nested within the lower side wall portion.

Other objects and advantages of the invention with become apparent from the detailed description which follows.

BRIEF DESCRIPTION OF THE DRAWINGS

FIG. 3 is a perspective view of another exemplary container in accordance with the invention;

FIG. 4 is a perspective view of the container shown in FIG. 3 but in a collapsed condition;

FIG. 4A is a perspective view of a container similar to that shown in FIG. 4, but with a generally oval shape;

FIG. 5 is a perspective view of the container shown in FIG. 3 but in a collapsed condition, and with the spray head wrapped about the container exterior;

FIG. 8 is a perspective view of another exemplary container in accordance with the invention;

FIG. 9 is a perspective view of the container shown in FIG. 8, but in a collapsed condition;

FIG. 12 is a side view of another exemplary container in accordance with the invention;

FIG. 13 is a side view of the container illustrated in FIG. 12 in the collapsed condition; and FIG. 14 is a plan view of the collapsed container illustrated in FIG. 13.

DETAILED DESCRIPTION OF THE DRAWINGS

Figure 1:
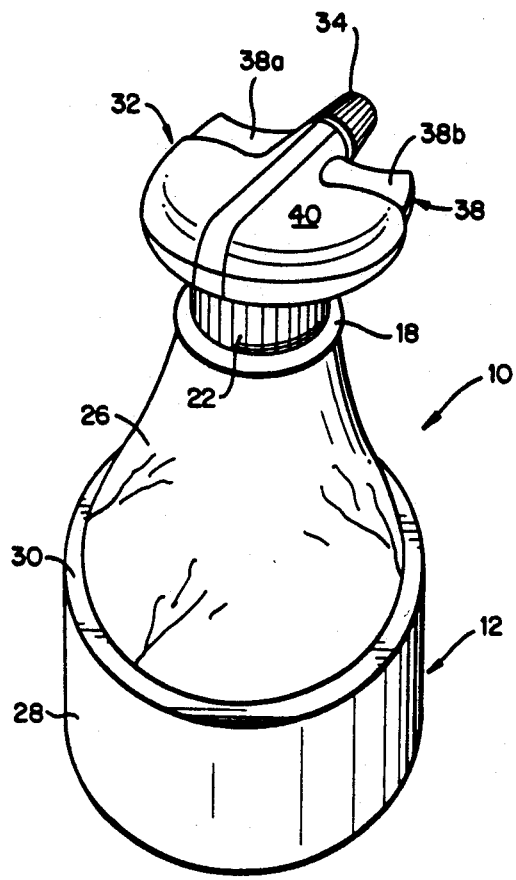
FIG. 1 is a perspective view of one exemplary container in accordance with this invention.
Figure 2:
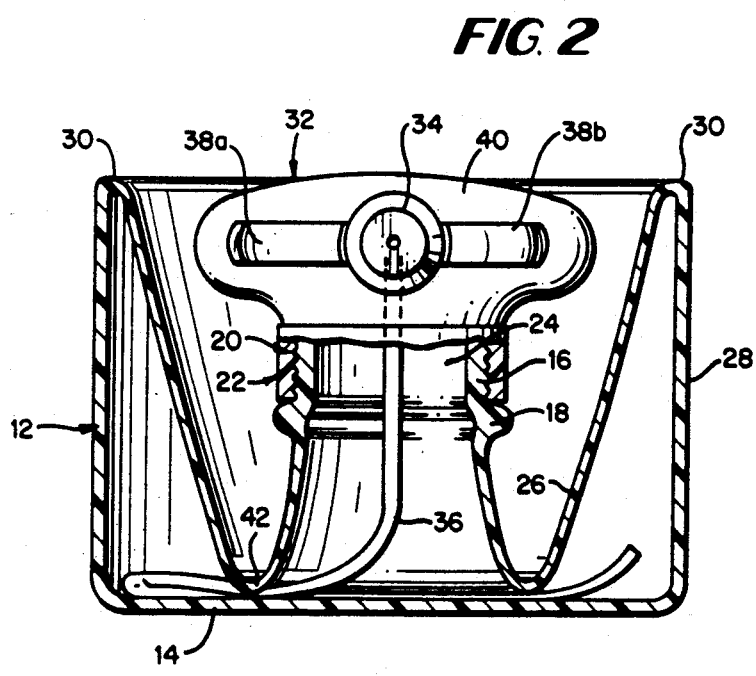
FIG. 2 is a side view, partly in section, of the container shown in FIG. 1, but in a collapsed condition.

With reference to FIGS. 1 and 2, a container 10 in accordance with a first exemplary embodiment of the invention generally includes a peripheral side wall 12, a bottom wall 14, and a dispensing portion 16 which, in this embodiment, includes an annular flange 18, an exteriorly threaded portion 20 adapted to receive a screw cap 22, and a discharge opening 24 (see FIG. 2).

The peripheral side wall 12 in this exemplary embodiment is formed to include three axial portions including the upper substantially cylindrical dispensing portion 16, an intermediate tapered portion 26, and a lower substantially cylindrical portion 28. The upper portion 16 has a wall thickness preferably in the range of about 55-75 mils. The intermediate tapered side wall portion 26 has a wall thickness preferably in the range of about 5-20 mils. The lower side wall portion 28 has a wall thickness preferably in the range of about 30-45 mils, while the bottom wall 14 may have a thickness of about 60 mils. Thus, while the upper and lower side wall portions 16 and 28 are flexible, they are relatively rigid as compared to the thinner intermediate portion 26. This arrangement permits easy collapse, extension and re-collapse of the container in a manner described in more detail below. This construction also results in a source reduction of the amount of plastic material required to make the container and, of course, the reduced profile of the container in the collapsed condition permits reduced volumes of post consumer waste as well as space savings during shipment and storage.

In order to achieve the telescoping action which enables collapse, expansion and recollapse of the container, the intermediate side wall portion 26 is tapered outwardly from top to bottom between the flange 18 and the interface with the lower portion 28. For purposes of convenience here, round containers are described but the invention embraces other container shapes as well.

The interface between the lower and intermediate side wall portions 26 and 28 may be defined by a transitional step or shoulder 30 where the side wall thickness changes (preferably abruptly), to thereby provide a well defined "fold line" (with a wall thickness of about 15 mils) which greatly facilitates the collapsing action of the container.

The screw cap 22 incorporates an integral spray head 32 which may include, for example, an adjustable nozzle 34 of conventional construction, the usual flexible draw tube 36, and a trigger mechanism 38. The specific manner of operation of the spray head 32 is not a part of this invention per se, but the low profile external configuration of the spray head and the manner in which the low profile permits the spray head to be substantially fully nested within the container in its collapsed condition, is a significant aspect of this embodiment of the invention.

Thus, the spray head 32 has a body portion 40, the width dimension of which is substantially greater than the height dimension. The body portion mounts the nozzle 34, with the trigger mechanism 38 including spring loaded, horizontally reciprocating portions 38a and 38b flanking the nozzle 34. This arrangement permits convenient grasping by the user and easy actuation of the spray head to dispense the container contents from the nozzle 34.

As best seen in FIG. 2, when the container 10 is in its collapsed condition, the spray head 32 is substantially fully nested within, or surrounded by, the bottom side wall portion 28, so that the spray head 32 does not protrude to any significant extent beyond the step or shoulder 30 which, in the collapsed condition, defines the upper edge of the container.

The container 10 may be collapsed to the condition illustrated in FIG. 2 by holding the container via bottom wall 14 and/or lower side wall portion 28, and exerting an axially compressive force at the spray head 32. It will be appreciated that, in order to collapse the container, venting of the container interior is required. This can be achieved by loosening the cap 22, holding the trigger in a depressed position while collapsing, or by any other suitable venting arrangement. Upon exertion of the axially compressive force, the thin intermediate portion 26 is caused to collapse or reverse fold about the step 30, as the upper and lower portions 16, 28 are telescoped one within the other. In the collapsed condition, as seen in FIG. 2, it will be appreciated that a second annular fold (in addition to that at step 30) will be formed at 42 where the reverse fold ends, so that the dispensing portion 16, cap 22 and spray head 32 remain upright.

It will be seen further that the axial extent of dispensing portion 16 and the intermediate portion 26, along with the height dimension of spray head 32, are selected such that, when collapsed, the spray head is, as noted earlier, substantially fully nested or enclosed (concentrically) within the lower side wall portion 28.

To convert the container back to its fully expanded or extended condition, shown in FIG. 1, the user may conveniently grip the spray head 32 of the container in one hand, and hold the bottom wall 14 and/or lower side wall 28 in the other, and simply pull in opposite directions. Here again, venting of the container interior, as described above, is required during extension.

Turning now to FIG. 3, another exemplary embodiment of the invention is disclosed. In this embodiment, the container 110 per se is substantially identical to the container 10 illustrated in FIGS. 1 and 2 and, accordingly, similar reference numerals are utilized to designate common elements, with the prefix "1" added. This embodiment, however, utilizes a spray head 132 of a conventional type, including a body portion 140, a nozzle 134 and a trigger 138.

With the spray head 132 applied, the container may nevertheless be collapsed to the condition illustrated in FIG. 4 and, although the spray head 132 protrudes above the uppermost edge of the lower side wall portion as defined by step 130, the arrangement nevertheless offers significant reduction in the normal height of the container thereby facilitating storage between uses.

Because this embodiment does not offer the same nesting capability as in the previously described embodiment, however, the container may be shipped in the configuration illustrated in FIG. 5 wherein a conventional screw cap 44 has been applied to the container while the spray head 132 and attached flexible draw tube 136 are wound around the exterior of the lower side wall portion 128 and held in place by, for example, a heat shrink type wrapping material 46.

Referring to FIG. 4A, a container utilizing the conventional upright spray head of the type described in conjunction with FIGS. 3, 4 and 5 is shown, but wherein the container itself is formed with a generally oval shape. By so forming the container, sufficient space is provided in the longitudinal direction of the spray head to permit collapse to a fully nested condition. For convenience, reference numerals similar to those used in FIG. 4 are used in FIG. 4A with a prime designation added.

Figure 6:
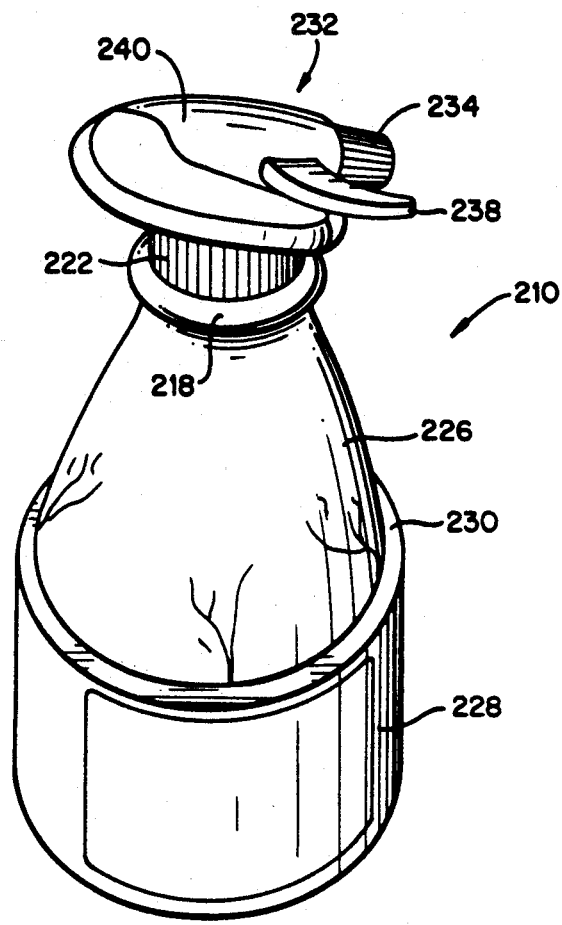
FIG. 6 is a perspective view of another exemplary container in accordance with the invention.
Figure 7:
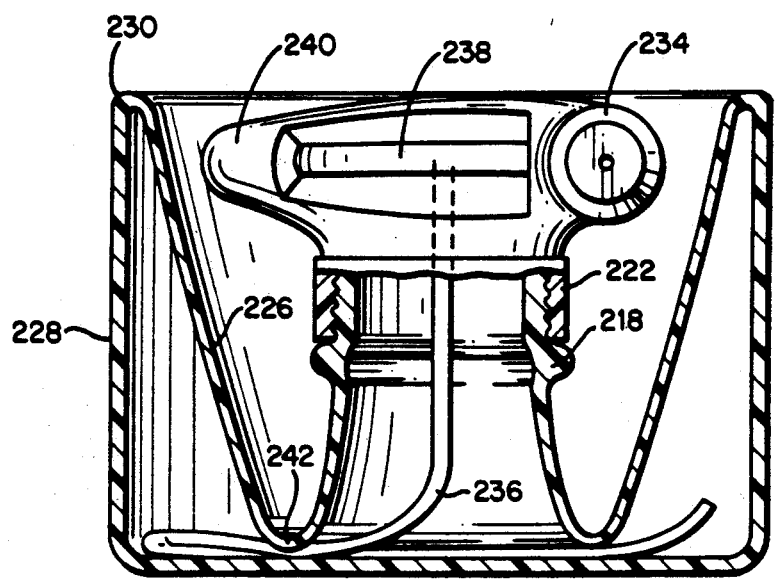
FIG. 7 is a side view, partly in section, of the container shown in FIG. 6, but in a collapsed condition.

Turning now to FIG. 6, still another embodiment of the invention is illustrated where again, the container 210 per se is substantially identical to the earlier described embodiments, with similar reference numerals used to designate common elements, with the prefix "2" added. In this instance, a spray head 232 is incorporated within the screw cap 222, with the spray head having a fairly typical configuration, including a nozzle 234, draw tube 236, and trigger 238. The spray head 232 is oriented sideways, i.e., so that the body portion 240 and trigger 238 lie substantially horizontally, thereby permitting the spray head 232 to maintain a low profile relative to the conventional upright configuration. As best seen in FIG. 7, upon collapse of the container, the spray head 232 is substantially enclosed within the lower side wall portion 228 of the container 210 as in the FIG. 1 embodiment.

Turning now to FIGS. 8 and 9, still another embodiment of the invention is disclosed wherein the container per se is substantially similar to the earlier described embodiment, and reference numerals used to designate common components have the prefix "3" added. The upper dispensing portion 316 is provided with a plurality of annular reinforcing ribs 48 to strengthen the upper portion of the container which includes a snap-on cap 50. In this embodiment, however, no spray head is employed and the container is intended for a more general application. Cap 50 may be provided with an integral hinge or tab 52 by which the cap 50 remains secured to the container even when removed from the discharge opening. The cap also includes a tab 54 which facilitates removal of the cap from the discharge opening. As best seen in FIG. 9, and upon collapse of the container, the cap 50 is substantially enclosed within the lower side wall portion 328 of the container.

Figure 10:
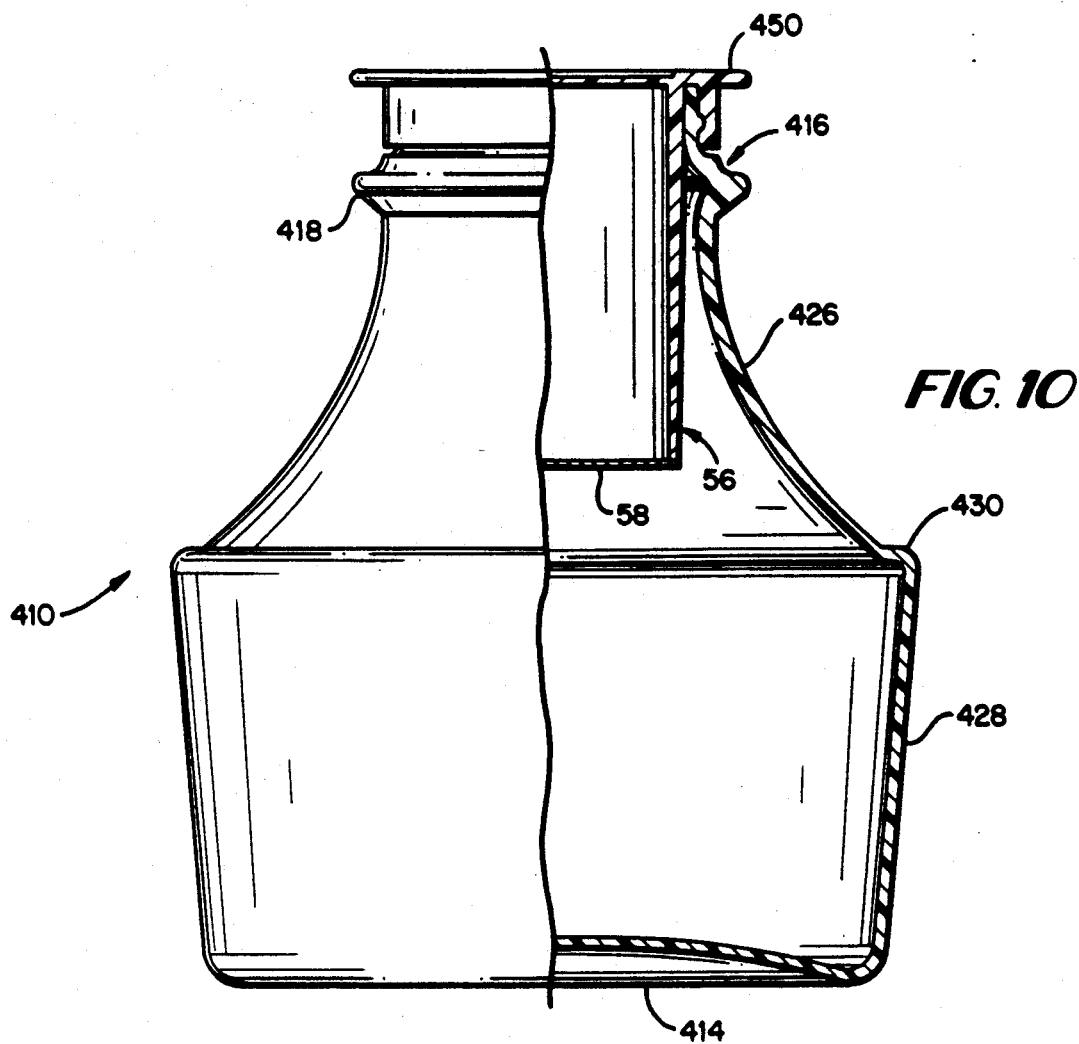
FIG. 10 is a side view of another exemplary container in accordance with the invention.
Figure 11:
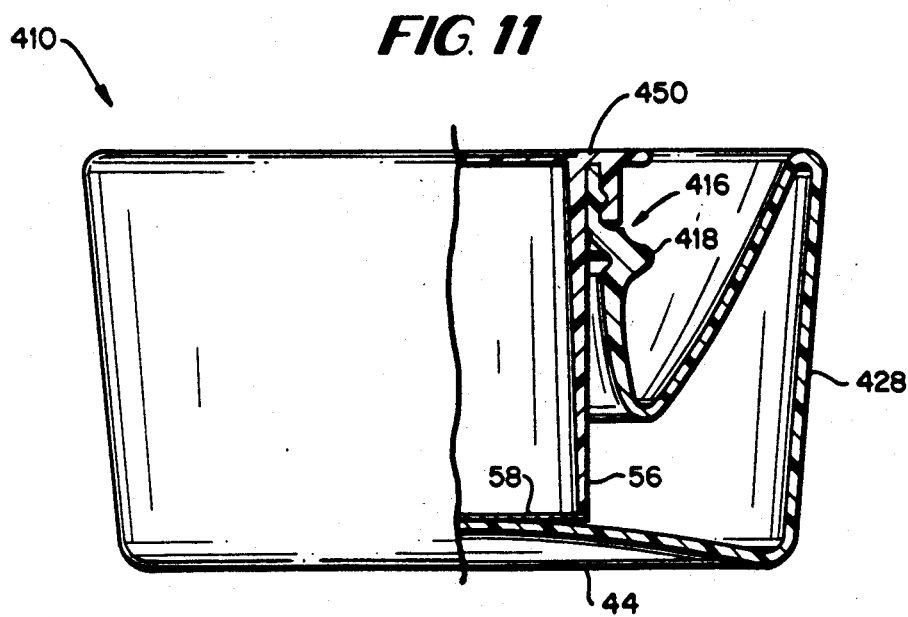
FIG. 11 is a side view of the container illustrated in FIG. 10 but in the collapsed condition.

With reference now to FIGS. 9 and 10, another embodiment of the invention is disclosed which is generally similar to the embodiment illustrated in FIGS. 8 and 9, and reference numerals use to designate common components have the prefix (4) added. Of particular significance, is the reconfiguration of the tapered intermediate side wall portion 426 which has been formed with a generally concave surface contour. The concave shape is conducive to collapsing the container to the condition illustrated in FIG. 11, and it has been found that the wall thickness for the intermediate taped portion 426 may be at the upper end of the previously disclosed range of 5-20 mils. As a result, the container has a more solid feel which may be desirable for certain container applications. The container 410 is also shown to include an interior cup 56 for holding concentrate or other ingredients to be mixed within the container. As will be appreciated by those of ordinary skill in the art, cup 56 may be formed in a number of ways, for example, the cup may be formed integrally with the cap and have an open end closed by a removable foil seal 58 (as shown). Alternatively, the cup may be formed with a solid bottom wall and an upper radially outwardly extending flange surrounding an open upper end, the cup held within the container discharge opening, sandwiched between the upper edge of the container and the screw cap. In any event, cup 56 is sized to be accommodated within the container in the collapsed condition as shown in FIG. 11.

FIGS. 12-14 illustrate yet another exemplary embodiment of the invention. The container 510 is similar to the oval container illustrated in FIG. 4A but incorporates the concave surface contour for the thin intermediate side wall portion as shown at 426 in FIGS. 10 and 11. Thus, reference numerals are used in FIGS. 12-14 similar to those in the previously described embodiments, but with the prefix "5" added. As previously described in connection with the embodiments illustrated in FIGS. 10 and 11, the concave intermediate portion 526 facilitates collapse of the container to the condition illustrated in FIG. 13. Moreover, by forming the container in a generally oval shape, the spray head 532 may be fully nested within the container when collapsed, as illustrated in FIGS. 13 and 14.

It will be appreciated, of course, that while the thin intermediate side wall portion 526 is shown in this embodiment as being asymmetrical with respect to the longitudinal axis of the container, it may also be formed symmetrical with the axis as in the previously described embodiments.

With all of the above described embodiments, it will be appreciated that the optional incorporation of integral handles and/or gripping areas as described in my above identified parent application may be applicable here as well to aid in the repeated collapse and extension of the container. It should be further appreciated that this invention is applicable to containers of various sizes, from, for example, a pint up to 5 gallons or more.

The above described exemplary embodiments of the invention contain numerous advantages from both a practical and an environmental standpoint. For example, from a practical standpoint, the collapsibility feature of the containers permits the efficient use of space during shipping, storage, and, ultimately, in the post consumer waste phase. At the same time, the incorporation of a very thin intermediate peripheral side wall portion effects a source reduction in the amount of plastic required for the manufacture of the container. A further advantage lies in the reusable nature of the container. Thus, after its initial use, the consumer may utilize the container for any number of purposes, and when not in use, the container may be efficiently stored in its collapsed configuration. By constructing the container so as to be easily and manually collapsed, expanded and recollapsed, the expected life of the container is substantially lengthened, and fewer containers will be disposed of after first use, thereby effecting even further reductions in post consumer waste.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A collapsible, extendable and recollapsible, plastic container comprising:
   a peripheral side wall extending between a bottom wall at one end thereof and a discharge opening at an opposite end thereof, said side wall having an upper neck portion, an intermediate portion and a lower portion, wherein at least said intermediate portion has a wall thickness less than the wall thickness of said lower portion, and wherein a cross-sectional area of at least said intermediate side wall portion progressively varies so that said upper and intermediate portions may be collapsed into said lower portion, and wherein
   said discharge opening is closed by a removable cap incorporating a spray head, said spray head lying substantially within said lower side wall portion when said container is collapsed.

2. The container of claim 1 wherein said spray head includes a body portion, a nozzle and a trigger mechanism.

3. The container of claim 1 wherein said spray head has a width dimension substantially greater than a height dimension.

4. The container of claim 2 wherein said spray head further includes a flexible draw tube.

5. The container of claim 1 including an annular step in a transition area between said lower side wall portion and said intermediate side wall portion.

6. The container of claim 1 wherein said upper neck portion has a wall thickness of at least about 55 mils, and said lower portion has a wall thickness of at least about 30 mils.

7. The container of claim 1 wherein said intermediate portion has a wall thickness of between about 5 and about 20 mils.

8. The container of claim 1 wherein said upper neck and said lower portions have a wall thickness of at least about 55 mils and at least about 30 mils, respectively, and said intermediate portion has a thickness of between about 5-20 mils.

9. The container of claim 1 wherein said intermediate portion has an increasing cross-sectional area from top to bottom.

10. The container of claim 1 wherein said peripheral side wall is substantially oval-shaped.

11. The container of claim 8 wherein said bottom wall has a thickness of about 60 mils.

12. A reusable plastic container comprising a bottom wall, a side wall including an upper dispensing portion including discharge opening, said side wall further including an intermediate portion and a lower portion and wherein said intermediate portion has a wall thickness less than said dispensing and lower portions, and further wherein said intermediate side wall portion is tapered so that said side wall is axially and manually collapsible to a condition where said dispensing and lower portions are telescoped one within the other with said intermediate portion at least partially reverse folded therebetween so that said dispensing portion is fully nested within said lower side wall portion, wherein said dispensing portion is closed by a removable cap, and wherein said cap incorporates a low profile spray head which does not protrude substantially beyond said lower portion when said container is in the collapsed condition.

13. A reusable plastic container comprising a bottom wall, a side wall including an upper dispensing portion including discharge opening, said side wall further including an intermediate portion and a lower portion and wherein said intermediate portion has a wall thickness less than said dispensing and lower portions, and further wherein said intermediate side wall portion is tapered so that said side wall is axially and manually collapsible to a condition where said dispensing and lower portions are telescoped one within the other with said intermediate portion at least partially reverse folded therebetween so that said dispensing portion is fully nested within said lower side wall portion, wherein said dispensing portion is closed by a removable cap, and wherein said cap incorporates an upright spray head.

14. The container of claim 13 wherein said container is oval-shaped.

15. The container of claim 13 wherein said spray head includes a body portion, a nozzle and a trigger mechanism.

16. The container of claim 13 wherein said spray head has a width dimension substantially greater than a height dimension.

17. A collapsible, extendable and recollapsible container comprising:
  a bottom wall;
  a peripheral side wall extending between said bottom wall and a discharge opening, said peripheral side wall including a lower portion having a first cross sectional area and first wall thickness, a tapered intermediate portion having a variable cross sectional area and second wall thickness, and an upper dispensing portion having a third cross sectional area and third wall thickness, wherein said second wall thickness is thinner than said first and third wall thicknesses, such that said peripheral side wall is movable between collapsed and extended positions;
  means for facilitating axial collapse of said container to said collapsed position, said means located at an interface between said lower portion and said intermediate portion; and
  a closure incorporating a spray head wherein said spray head is adapted to be substantially fully nested within said lower portion when said container is in the collapsed condition.

18. The container of claim 17 wherein said closure comprises a screw cap, and further wherein said spray head includes a body portion, a nozzle, a trigger mechanism and a flexible draw tube.

19. The container of claim 17 wherein, in the collapsed condition, said spray head is in substantial horizontal alignment with said facilitating means.

20. The container of claim 17 wherein said peripheral side wall is substantially oval-shaped.

21. The container of claim 17 wherein said spray head has a height dimension substantially less than a width dimension.

* * * * *